(12) United States Patent
Persson et al.

(10) Patent No.: US 9,798,565 B2
(45) Date of Patent: Oct. 24, 2017

(54) DATA PROCESSING SYSTEM AND METHOD HAVING AN OPERATING SYSTEM THAT COMMUNICATES WITH AN ACCELERATOR INDEPENDENTLY OF A HYPERVISOR

(71) Applicant: ARM Limited, Cambridge (GB)

(72) Inventors: Hakan Persson, Bjarred (SE); Matt Evans, Cambridge (GB); Jason Parker, Cambridge (GB); Marc Zyngier, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 14/682,313

(22) Filed: Apr. 9, 2015

(65) Prior Publication Data
US 2015/0293776 A1 Oct. 15, 2015

(30) Foreign Application Priority Data

Apr. 9, 2014 (GB) .................................. 1406400.0

(51) Int. Cl.
*G06F 9/455* (2006.01)
*G06F 9/50* (2006.01)

(52) U.S. Cl.
CPC ............ *G06F 9/45558* (2013.01); *G06F 9/50* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS 7,644,407 B2 * 1/2010 Cowperthwaite ... G06F 9/45558
              711/203
2005/0235123 A1 * 10/2005 Zimmer ................ G06F 12/126
              711/170

(Continued)

FOREIGN PATENT DOCUMENTS

| EP | 2437161 A1 | 4/2012 |
| WO | 2013178245 A1 | 12/2013 |
| WO | 2014031833 A1 | 2/2014 |

OTHER PUBLICATIONS

Cisco, "Gain High-Performance Virtual Desktops with Uncompromised 3D Graphics Experiences Delivered by Cisco, Citrix, and NVIDIA." Cisco.com. N. p., Dec. 2013. Web. May 19, 2016. <http://www.cisco.com/c/dam/en/us/products/collateral/switches/nexus-7000-series-switches/le_40402_sb_vdigu_citrix.pdf>.*
Search Report dated Oct. 27, 2014 in GB Patent Application No. GB1406392.9, 3 pages.
Search Report dated Oct. 30, 2014 in GB Patent Application No. GB1406400.0, 3 pages.

(Continued)

*Primary Examiner* — Wei Zhen
*Assistant Examiner* — Binh Luu
(74) *Attorney, Agent, or Firm* — Vierra Magen Marcus LLP

(57) ABSTRACT

A data processing system includes one or more processors that each execute one or more operating systems. Each operating system includes one or more applications. An accelerator provides a shared resource for a plurality of the applications and has one or more input/output interfaces for the submission of tasks to the accelerator from an application. A hypervisor manages the allocation of the input/output interfaces to the one or more operating systems and a hypervisor interface enables communication between the (Continued)

hypervisor and the accelerator. The system is capable of being configured such that an operating system that has been allocated an input/output interface is capable of communicating with the accelerator via the input/output interface independently of the hypervisor. A memory management unit is capable of providing an isolated region of a memory for use by the operating system while the operating system retains its allocated input/output interface.

15 Claims, 6 Drawing Sheets

(56) References Cited

U.S. PATENT DOCUMENTS

| | | | |
|---|---|---|---|
| 2007/0052715 | A1 | 3/2007 | Levit-Gurevich et al. |
| 2012/0084774 | A1 | 4/2012 | Post et al. |
| 2012/0272037 | A1* | 10/2012 | Bayer ............... G06F 12/0292 711/202 |
| 2013/0091500 | A1* | 4/2013 | Earl ................... G06F 9/4555 718/1 |
| 2015/0143072 | A1* | 5/2015 | Sibert ............... G06F 12/1036 711/206 |

OTHER PUBLICATIONS

Gupta et al. "GViM: GPU-accelerated Virtual Machines," 3rd Workshop on System-level Virtualization for High Performance Computing (HPCVirt09), Nuremberg, Germany, Association for Computing Machinery (ACM), Mar. 31, 2009, 8 pages.

Kadav et al. "Live Migration of Direct-Access Devices" Association for Computing Machinery (ACM), Jul. 2009, 7 pages.

Le Vasseur et al. "Standardized but Flexible I/O for Self-Virtualizing Devices" WIOV'08 Proceedings of the First conference on I/O virtualization, USENIX Association, Berkeley, CA Dec. 10, 2008, 7 pages.

Raj et al. "Self-Virtualized I/O: High Performance, Scalable I/O Virtualization in Multi-core Systems" Georgia Institute of Technology, [retrieved from http://cercs.gatech.edu/tech-reports/tr2006/git-cercs-06-02.pdf], 2006, 23 pages.

Zhai et al. "Live Migration with Pass-through Device for Linux VM" Proceedings of the Linux Symposium, vol. Two, Ottawa, Ontario, Canada, Jul. 23-26, 2008, 9 pages.

Search Report dated Oct. 27, 2014 in GB Patent Application No. GB1406393.7, 3 pages.

* cited by examiner

DATA PROCESSING SYSTEM AND METHOD HAVING AN OPERATING SYSTEM THAT COMMUNICATES WITH AN ACCELERATOR INDEPENDENTLY OF A HYPERVISOR

BACKGROUND

The technology described herein relates to data processing systems in which an accelerator, such as a graphics processing unit (GPU), a video accelerator or a digital signal processor, etc., acts as a common shared resource for a plurality of applications (such as games, productivity applications, browsers, etc.) and in particular to a method and system for communication in a data processing system.

Known virtualised data processing systems which use an accelerator as a common shared resource for a number of applications, e.g. running on different virtual machines (operating systems), operate in a number of different ways. In one such system involving hardware virtualisation of network interface cards in a server, the virtual machines which run the operating system for the applications are connected directly to the network interface, i.e. this connection is static, and the interface between the virtual machine and the hardware is partly virtualised in order to communicate with the accelerator.

This arrangement requires a specific device driver for the type of network interface being used, for the initialisation of, and subsequent communication with, the interface. In another such system a graphics accelerator may be partly virtualised by using a specific graphics driver that captures the commands from one virtual machine (operating system) to the graphics acceleration application programming interface (API), e.g. using DirectX or OpenGL, and then forwards them to a different virtual machine which has access to the graphics accelerator such that the commands can be executed. Clearly there is a large drawback in this arrangement because of the transfer of commands between the two operating systems (virtual machines), which is a complex arrangement and comes at a large processing cost.

In a third such system, a graphics accelerator is split into a fixed number of partitions, with each partition being assigned directly to a virtual machine, i.e. there a static connection as with the first example. An example of such a product is NVIDIA GRID.

The static connection between virtual machines and their interfaces to the accelerator, and the need to use specific drivers, in these known systems, means that existing virtualised systems are not very flexible, for example in terms of being able to dynamically manage the virtual machine connections to the accelerator.

BRIEF DESCRIPTION OF THE DRAWINGS

A number of embodiments of the technology described herein will now be described, by way of example only, and with reference to the accompanying drawings, in which.

DETAILED DESCRIPTION

Figure 1:
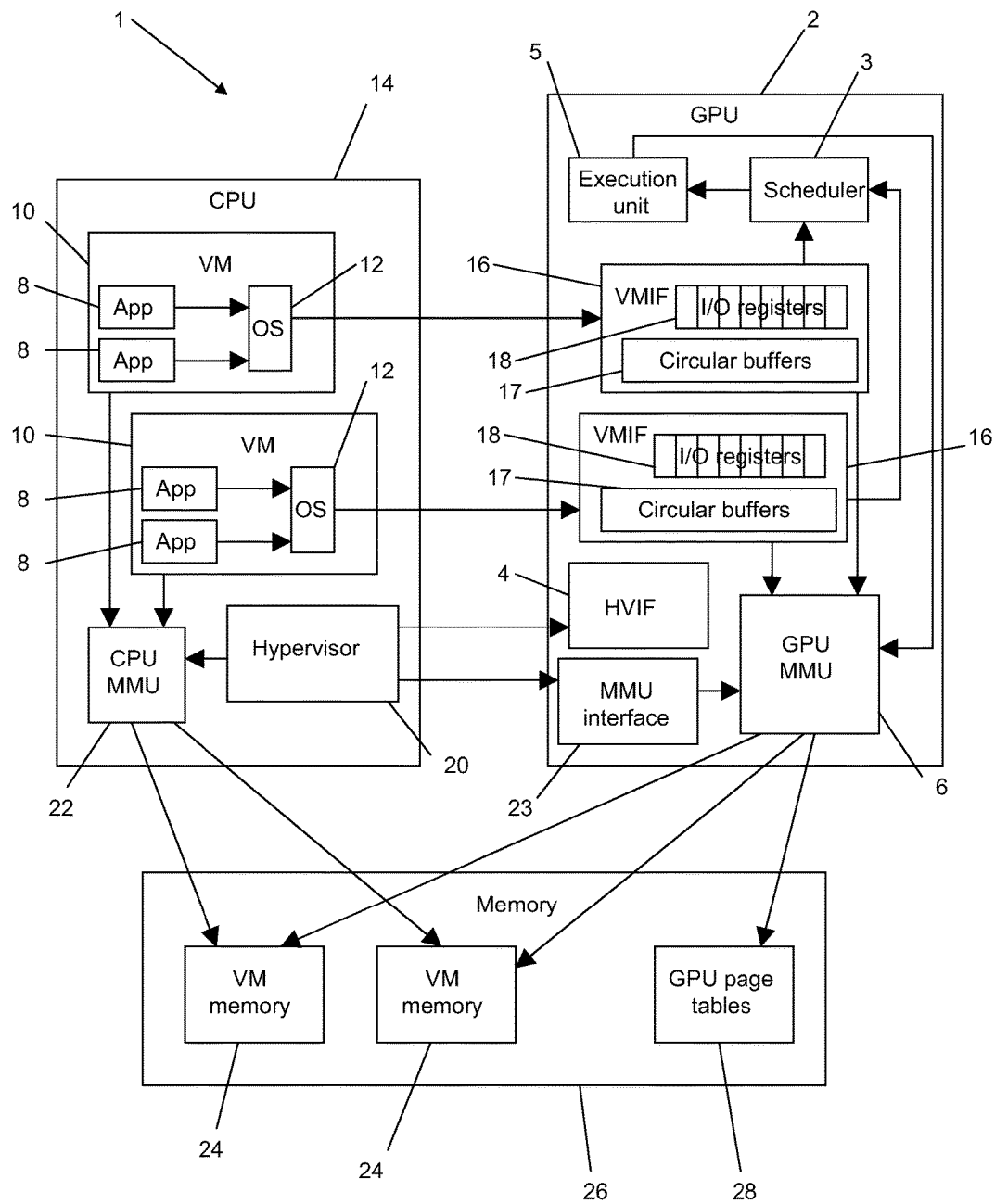
FIG. 1 shows schematically an embodiment of a data processing system in which an accelerator acts as a shared resource for a plurality of applications.

One embodiment of the technology described herein comprises a method of operating a data processing system, wherein the data processing system comprises:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the operating systems executing on the one or more processors;

a hypervisor interface that enables communication between the hypervisor and the accelerator;

memory accessible to the operating systems executing on the one or more processors and to the accelerator; and a memory management unit that controls access to the memory;

the method comprising:

when an operating system executing on one of the processors has been allocated an input/output interface to submit a task to the accelerator:

the operating system, once it has been allocated the input/output interface, communicating with the accelerator via the input/output interface independently of the hypervisor to submit its task to the accelerator; and the memory management unit operating to provide an isolated region of the memory for use by the operating system whilst the operating system retains its allocated input/output interface.

Another embodiment of the technology described herein comprises a data processing system comprising:

one or more processors that each execute one or more operating systems, each operating system including one or more applications;

an accelerator that provides a shared resource for a plurality of the applications;

one or more input/output interfaces for the submission of tasks to the accelerator;

a hypervisor that manages the allocation of the input/output interfaces to the operating systems executing on the one or more processors;

a hypervisor interface that enables communication between the hypervisor and the accelerator;

a memory accessible to the operating systems executing on the one or more processors and to the accelerator; and a memory management unit that controls access to the memory; wherein:

the system is configured such that an operating system that has been allocated an input/output interface can communicate with the accelerator via the input/output interface independently of the hypervisor to submit its task to the accelerator; and the memory management unit is configured to provide an isolated region of the memory for use by the operating system whilst the operating system retains its allocated input/output interface.

The data processing system of the technology described herein has one or more operating systems (virtual machines) that can connect to a shared accelerator via input/output interfaces, such that they can submit tasks to the accelerator.

The input/output interfaces are configured such that operating systems can communicate with the accelerator via the interfaces independently of the hypervisor, i.e. there is a direct communication path from the operating system to the accelerator via the respective input/output interface. This allows each operating system direct access to an input/output interface where it can write commands to be submitted to the accelerator and read responses received from the accelerator.

The data processing system also includes a memory management unit that has isolated regions of memory for the operating systems that are using the input/output interfaces to communicate with the accelerator. (The memory is isolated for each operating system, but is shared between each operating system and the accelerator.) This can be used to ensure that communication from different operating systems (and from different operating system instances) to the accelerator and requests for data from memory from different operating systems (and from different operating system instances) that are communicating on the accelerator do not interfere with each other.

Providing direct communication paths between the one or more operating systems and the accelerator, allows the hypervisor (and its interface) to be bypassed when an operating system is submitting a task to the accelerator. This then means that software specific to each operating system or application is not required in the hypervisor in order to communicate with the accelerator, i.e. there is little or no need for application specific drivers in the hypervisor for the accelerator (e.g. which request specific information from the accelerator) as is practised in conventional systems.

Moreover, as the hypervisor does not need to be concerned with how the operating systems communicate with the accelerator, the hypervisor can (and preferably does) use a common communication protocol with the accelerator (via the hypervisor interface) in order to communicate with the accelerator and manage its connections (via the one or more input/output interfaces) to the one or more operating systems, irrespective of the nature of the operating systems and/or of the accelerator themselves. The hypervisor only needs to have knowledge of the way in which the operating systems are connected to the accelerator and how they are to be managed, so it can use a common communication protocol regardless of the function of the accelerator (and for and across different types of accelerators). This allows the technology described herein to be used in a number of different data processing systems, e.g. including different types of accelerators, as will be discussed below.

Older and future hypervisors may also be able to work with the accelerator, owing to the generic hypervisor communication, as it may not matter that they are running legacy or future versions of software.

Having an isolated region of memory for each of the operating systems that are using the input/output interfaces means that each instance of an operating system connected to the accelerator via one of the input/output interfaces is separate from each of the other operating systems (operating system instances) also connected to the accelerator. Keeping each instance of the operating systems separate, but connected in the same manner to the accelerator (i.e. connected directly and with an isolated region of memory), simplifies these connections and therefore the allocation of the one or more input/output interfaces to the one or more operating systems (operating system instances) and their subsequent management by the hypervisor.

The system of the technology described herein also facilitates dynamic management of the operating systems connected to the accelerator, owing to the separation of the operating system instances and the common communication protocol used by the hypervisor, which allows the hypervisor to disconnect operating systems from the accelerator and connect other operating systems to the accelerator without affecting the other operating systems (operating system instances) connected to the accelerator.

The accelerator may be any suitable accelerator (execution/functional unit) that can provide a common resource to an application. It could, for example, comprise a graphics processing unit (GPU), a direct memory access (DMA) controller, an encryption accelerator, a video accelerator, a network (processing) interface, an image signal processor (ISP), a digital signal processor (DSP), audio hardware, etc., i.e. to be used in many different types of data processing systems. The accelerator can essentially comprise any component that is optimised for a particular task. In one set of embodiments it comprises a graphics processing unit.

The system may comprise only a single accelerator, though embodiments are envisaged in which the system comprises a plurality of accelerators.

Where the data processing system comprises a plurality of accelerators, they are, in an embodiment, each configured in the manner of the technology described herein. In an embodiment the plurality of accelerators are configured to allow migration of operating systems (virtual machines) between different accelerators.

The accelerator (or each accelerator) should, and in an embodiment does, comprise at least an execution unit (a functional unit) that is operable to perform tasks for applications. In an embodiment, the accelerator also includes the input/output interfaces for the submission of tasks to the accelerator.

Each input/output interface can accept at least one task for the accelerator, e.g. a group of tasks from a particular operating system. There may only be one input/output interface for the submission of tasks to the accelerator, but in an embodiment there is a plurality of input/output interfaces, as discussed above.

Having multiple virtual machine input/output interfaces, e.g. four or eight, allows multiple operating systems (virtual machines) to be connected to the accelerator in parallel, thus allowing them to submit tasks simultaneously. In an embodiment, each operating system is able to submit multiple tasks to an input/output interface to which it has been allocated.

Where there are plural input/output interfaces, then the system in an embodiment further comprises an accelerator task scheduler that can arbitrate between tasks allocated to the input/output interfaces and cause the accelerator to execute tasks that are allocated to the input/output interfaces.

Thus, in an embodiment the accelerator comprises a task scheduler, and the task scheduler and thus the accelerator can, in an embodiment, independently schedule between a plurality of operating systems and/or applications that are submitting multiple executable tasks to the accelerator via the plurality of input/output interfaces.

Thus, in an embodiment, the accelerator comprises an execution unit, a task scheduler, and the input/output interfaces. Other arrangements would, of course, be possible.

It would also be possible to execute tasks from several input/output interfaces in parallel if desired (and the accelerator has that capability). Where there are plural input/output interfaces, then in an embodiment different applications (and different applications from different virtual machines (operating systems), where present) can concurrently access the separate input/output interfaces.

Thus, in an embodiment, the method and the system of the technology described herein allow multiple virtual machines in the system to be communicating directly with the accelerator, i.e. allowing the applications to access the accelerator's resources directly, without intervention from the hypervisor.

Thus it will be appreciated that in certain embodiments, the method and the system of the technology described herein allows multiple virtual machines in the system to be communicating directly with the accelerator, i.e. allowing the applications to access the accelerator's resources directly, with minimal intervention from the hypervisor. Furthermore, more virtual machines can have access to the accelerator than there are hardware resources, i.e. the number of virtual machines can be greater than the number of virtual machine input/output interfaces.

The simple arrangement of the connection of the operating systems to the accelerator of the technology described herein, e.g. compared with the specific nature of connections in the prior art, which is common to each connection in the system means that any virtual machine input/output interface can accept any virtual machine to connect thereto. This, coupled with the common communication protocol used by the hypervisor to manage the virtual machine connections with the accelerator, then allows dynamic management of the virtual machines and their connections via the input/output interfaces with the accelerator. This is because virtual machines can easily be swapped in and out of connection with the accelerator via the input/output interfaces because a particular operating system (virtual machine) does not need to be tied to a particular interface.

Furthermore, migrating of virtual machines to other of the one or more processors and also different accelerators is possible owing to the communication protocol used by the hypervisor, i.e. it is both possible to do this owing to the common nature of the communication which will thus be accepted by different accelerators, and easy owing to the simplicity of the communication. Thus the virtualisation of the control plane can be operated in a very flexible manner, with separate control paths to the accelerator that are independent of the hypervisor for each virtual machine.

The input/output interfaces for the accelerator can be implemented in any desired and suitable manner.

In one embodiment, each input/output interface for the accelerator comprises a memory area, e.g. one or more circular memory buffers, that can (and that are to be used to) store information (data), e.g., relating to tasks being or to be performed by the accelerator, and a signalling mechanism, in an embodiment in the form of one or more registers, e.g. doorbell registers, to be used for signalling purposes, e.g., to indicate that data has been, or should be, added to, or read from, the memory area.

In an embodiment, the register can also, if desired, be used for the purposes of storing information (data), as well as acting as a signalling mechanism.

In an embodiment the memory area is shared by the accelerator and the operating system (the operating system instance) that the interface has been allocated to. This enables data to be shared between the accelerator, and the one or more operating systems (virtual machines) which are connected to the input/output interfaces.

The memory area, e.g. the circular memory buffers, can be provided as desired. It could, e.g. be implemented by internal RAM, and/or, for example, part of main memory in the system could be used as part or all of the memory areas for each of the one or more input/output interfaces. In an embodiment the memory area for each input/output interface is part or all of the isolated region of the memory for the input/output interface in question (thus in an embodiment the isolated region of memory for the input/output interface serves as, inter alia, a memory area for the storage and exchange of data and/or commands and responses between the accelerator and an operating system instance that is using the input/output interface).

In this arrangement, in an embodiment the memory area is used to store information (data) for tasks for the accelerator, during normal operation of the system, i.e. after initialisation, and the registers are used to indicate that data has been added to, or removed from, the circular memory buffers.

The signalling mechanism can operate as desired for signalling between the accelerator and an operating system. Where the signalling mechanism comprises one or more registers then, in an embodiment, different bit positions within the registers are defined as representing particular signals, e.g. commands. Thus, for example, one bit position could be used to indicate that data has been written to (and so should be read from) a memory area, with another bit position acting as a command to write a particular set of data to the memory area.

In an embodiment the signalling mechanism, e.g. register, is arranged to allow one way communication between the accelerator and the operating system, and vice versa. This could be achieved, e.g., by using one set of bits in the register for sending signals from the accelerator to the operating system and using another set of bits in the register for sending signals from the operating system to the accelerator.

The input/output interfaces can be configured in any desired and suitable manner to allow the operating systems (operating system instances) to communicate with the accelerator via the input/output interfaces independently of the hypervisor. In an embodiment the input/output interfaces of the accelerator can be used directly by the operating systems. In an embodiment each operating system's driver for the accelerator can access the input/output interfaces directly (once it has been allocated an interface), and can directly read and write commands, responses and data there.

Each input/output interface for the submission of tasks (e.g. virtual machine interfaces) can accept at least one task for the accelerator. There may only be one input/output interface for the submission of tasks, but in an embodiment there is a plurality of such input/output interfaces (e.g. 4 or 8), as discussed above. Where there are plural input/output interfaces, then in an embodiment the system further comprises an accelerator task scheduler that can arbitrate between tasks allocated to the task submission input/output interfaces and cause the accelerator to execute tasks that are allocated to these input/output interfaces. It would also be possible to execute tasks from several input/output interfaces in parallel if desired (and the accelerator has that capability). Where there are plural task submission input/output interfaces, then in an embodiment different applications (and different applications from different virtual machines, where present) can concurrently access the separate input/output interfaces.

The isolated region of memory for use by the operating system while it is connected to its allocated input/output interface can be used for a number of purposes. First, in an embodiment the isolated region of memory is used by the operating system for running the one or more applications, i.e. through the submission of tasks to the accelerator for execution. Second, in an embodiment the isolated region of memory is shared between (accessible by both) the processor on which the operating system is running and the accelerator, and is used for exchanging data, e.g. graphics data, such that the tasks submitted by the operating system connected to the input/output interface can be executed on the accelerator. Third, in an embodiment the isolated region of memory (shared between the processor on which the operating system is running and the accelerator) is used for exchanging commands and responses between the operating system and the accelerator. In an embodiment, as discussed above, the exchange of commands and responses, and the exchange of data, can be implemented using a set of one or more registers and one or more circular memory buffers.

The task or tasks to be performed by the accelerator can be any desired and suitable tasks (e.g. depending on the nature of the accelerator), such as, and in an embodiment, a compute job. In an embodiment it is one of: drawing an object on a screen, composing multiple graphic layers into a display frame, filtering an image to reduce noise, processing data (e.g. encrypting it, wrapping it with applicable protocol layers) and, e.g., transmitting it over a network, spell checking a text against a dictionary, evaluating a time increment in a physics model, etc.

It is believed that the technology described herein will, inter alia, be suitable for the low latency synchronous dispatch of small compute jobs (and so in an embodiment, the task or tasks is or are small compute jobs) and for asynchronous dispatch and other tasks, such as graphics acceleration.

The applications may be any suitable application, such as games, camera applications, image processing applications, browsers, web servers, productivity applications (word processors, spread sheets etc.), etc.

The plural applications that are using the accelerator as a common shared resource may comprise, for example, multiple applications within a single operating system, applications distributed across multiple virtual machines (operating systems) hosted on a single (physical) processor, applications operating on multiple physical (host) processors (whether as virtual machines or not), or any combination of this. Thus, the data processing system may comprise, for example, multiple applications operating under a single operating system, multiple virtual machines operating on a single physical host processor, or multiple host physical processors (each then, e.g., hosting one or more virtual machines), or any combination thereof. Furthermore, a virtual machine (operating system) may be run across multiple physical processors, and similarly a physical processor may be time-shared between multiple virtual machines, as described above.

Thus the accelerator, e.g. graphic processing unit, may be a common resource shared between plural processes in an individual virtual machine or physical processor, or shared between plural virtual machines and/or physical processors, etc.

The system also includes a hypervisor that is, inter alia, operable to manage the allocation of the accelerator input/output interfaces to operating systems executing on the one or more processors. There is also correspondingly a hypervisor interface for communication between the hypervisor and the accelerator.

The hypervisor and the hypervisor interface can be implemented and configured in any desired and suitable manner. The hypervisor will, as is known in the art, typically comprise a software routine that executes on the or each processor that is executing the operating systems. In one embodiment, the hypervisor interface is in a fixed location, using a predefined data structure, e.g. also on the accelerator. This enables the hypervisor interface to know where the accelerator is in the memory map.

The memory management unit can be implemented and operated to control access to the memory as desired.

In an embodiment there is at least a memory management unit on or as part of the accelerator. In an embodiment both the processor or processors that execute the operating systems (the host processor(s)) and the accelerator include memory management units, that, inter alia, control access to the memory by the one or more processors and by the accelerator respectively.

In an embodiment the memory management unit(s) translates virtual memory addresses to physical memory addresses, in an embodiment using one or more page tables that map virtual memory addresses to physical memory addresses, as is known in the art.

The and each memory management unit is arranged to give an isolated memory region for each (instance) of an operating system that has an input/output interface to the accelerator. This helps to ensure that requests from different operating systems for data from memory do not corrupt each other.

The isolation of the memory regions for different operating system instances can be achieved as desired, but in an embodiment appropriate memory mapping is used for this. In an embodiment the memory management unit(s), e.g. through configuration of the page tables, is arranged to give each of the one or more operating systems with an independent memory allocation, i.e. the isolation arises from the physical separation of the memory allocations in the memory.

In an embodiment, the system implements two stage memory mapping (two separate address translation stages are supported).

In this case there is, in an embodiment, a first stage (stage 1) memory mapping that implements virtual address to intermediate physical address translation (and is designed for use by a guest operating system and will, e.g., in an embodiment, work similarly to a traditional CPU MMU), and a second stage (stage 2) memory mapping that translates intermediate physical addresses to physical addresses (and that is, e.g., configured to enable any guest operating system to directly configure direct memory access capable devices in the system whilst sharing with them the same address space at intermediate physical address space level).

Having two stages of address translation in this way enables the ownership in the different stages between the guest operating system (stage 1) and the hypervisor (stage 2) to be more clearly defined.

Where such a two stage memory mapping arrangement is used, the isolation of the memory regions for different operating systems is, in an embodiment, achieved by configuration of the stage 2 page table translations.

In such arrangements, a memory management unit could, e.g., be arranged to provide both the stage 1 and stage 2 address translation stages, or it could be configured to provide stage 1 or stage 2 translations only. A memory management unit may, e.g., be configured to provide stage 2 translations only, for example to enable a device that already has an MMU to be managed by a system hypervisor.

As the input/output interfaces are accessible directly by the one or more operating systems, in an embodiment they have associated memory addresses (address space) for this purpose. In this case, each separate input/output interface is, in an embodiment, associated with (occupies) a different MMU (memory management unit) translation page of the system (and in an embodiment occupies an integer multiple of a full MMU translation page (page of address space)), as that will then facilitate the MMU page tables being used to control access to the input/output interfaces. Thus, in an embodiment the MMU, by associating each separate input/output interface with a different MMU translation page, separates the access to the different input/output interfaces for each of the one or more operating system instances connected thereto.

In the embodiments in which the system comprises a separate register for signalling (e.g. for indicating that data has been added to, or removed from, the memory area), e.g. a doorbell register, in an embodiment separate MMU pages are used for the memory area and for the register, and in an embodiment a separate MMU page is associated with each register and with each memory area of the one or more input/output interfaces.

In an embodiment the data processing system comprises a control mechanism for the MMU on the accelerator to facilitate the above operation (e.g. to configure the stage 2 page table translation appropriately). This control could be performed via the hypervisor interface but, in an embodiment, the system comprises a separate interface for the control of the MMU by the hypervisor.

In an embodiment each of the accelerator operating system (virtual machine) input/output interfaces is initialised before it can be used by one of the operating systems to access the accelerator's resources. In an embodiment the hypervisor interface is also initialised to enable to hypervisor to communicate with the accelerator. The different types of interfaces could be initialised at different stages, e.g. on start-up or power-up, or triggered by a particular state of the system, e.g. by a virtual machine requesting to access the accelerator's resources. Depending on the type of the interface, some interfaces may need to be initialised at multiple stages during operation of the system, while some may only need to be initialised once, e.g. on start-up.

The hypervisor interface will generally be required to be initialised each time the system is powered on, e.g. on start-up or after a re-boot. A re-boot of the accelerator may happen as part of normal operation of the system, for example the accelerator may be powered down in a period when it is not being used and then re-booted when its resources are needed again. The initialisation of the hypervisor interface will generally follow after the initialisation of the accelerator (the details of which are generally known in the art and so will not be discussed further).

The initialisation of the accelerator may be the trigger for the initialisation of the hypervisor interface to start, e.g. after successful completion of the accelerator initialisation. Such a sequence may be beneficial if, for example, the accelerator provides, during its initialisation, information regarding its capabilities to the hypervisor, which can then be verified by the hypervisor during its initialisation.

In an embodiment the hypervisor controls (via the hypervisor interface) the initialisation of the one or more input/output interfaces that the operating system(s) can use to establish a connection with the accelerator to enable an operating system to submit tasks to the accelerator for execution. In an embodiment this can be done both at the initial start up of the data processing system but also during and for dynamic management of the connection of the one or more operating systems (virtual machines) to the accelerator. In the set of embodiments in which the system comprises multiple virtual machine input/output interfaces, these input/output interfaces need not be initialised all at the same time, e.g. they could just be initialised before they are required to be used. In an embodiment, for example, a virtual machine interface is initialised when a virtual machine not currently connected to the accelerator has one or more tasks to submit to the accelerator for execution.

In an embodiment the initialisation of the hypervisor interface or one of the virtual machine input/output interfaces is started by sending a signal to the accelerator, e.g. from one of the one or more processors. In order to indicate which of the input/output interfaces is to be initialised, in an embodiment a set of initialisation parameters is made available to the accelerator, e.g. by writing them to the shared memory.

The initialisation of the interfaces may be carried out in any desired and suitable manner, however in an embodiment the interfaces are initialised with a defined initialisation protocol.

In an embodiment, in order to initialise an interface, first one of the one or more processors sends a first signal to the accelerator. The accelerator, in response to receiving the first signal, writes one or more selected pieces of information representative of one or more capabilities of the accelerator to a storage area (which, in an embodiment, is accessible by at least the one or more processors and the accelerator), and sends a second signal to the processor. The processor, in response to receiving the second signal, reads the one or more selected pieces of information from the storage area. The processor then sends a third signal to the accelerator and the accelerator configures the input/output interface in response to the third signal from the processor.

When an input/output interface for the accelerator is to be initialised, the accelerator and the processor which is requesting to initialise the interface exchange initialisation signals, i.e. perform a handshaking procedure. A first signal from the processor to the accelerator starts the initialisation process, i.e. this is effectively the initialisation request from the processor, and then the accelerator returns a second signal to the processor. Further signals may be exchanged between the processor and the accelerator, as will be discussed below.

The accelerator, in response to receiving the first signal from the processor, writes out information regarding its capabilities to a storage area that can be accessed by both the accelerator and the processor. This makes the capability information of the accelerator readily available to be read by the processor, and subsequently by further components, e.g. others of the one or more processors or the one or more operating systems, when they require this information. Generally, the accelerator and the one or more processors will have permission to write to and read from the storage area.

In an embodiment the one or more selected pieces of information representative of one or more capabilities of the accelerator comprise one or more of: the size of the accelerator's local memory; the initialisation sequence status; the status of the input/output interfaces, e.g. the tasks or commands that are pending or running, as it is reasonably common when the state of an interface or virtual machine is loaded, saved or restored that this information will be needed, as well as for scheduling purposes for tasks. In addition, in an embodiment, the one or more selected pieces of information also or instead comprises one or more of: the version number of the accelerator; the firmware and/or hardware version of the accelerator; the size of memory available to each input/output interface; the number of possible input/output interfaces (which may depend on the size of the memory available to each input/output interface); and the accelerator ID register. Furthermore, the system may comprise one or more flags reserved to indicate future capabilities of the system.

If the input/output interface being initialised is the hypervisor interface, in an embodiment the selected pieces of "capability" information that are written by the accelerator comprise one or more of (and, in an embodiment, all of): the number of input/output interfaces that the system can support, the size of the shared storage area available to the input/output interfaces, and the ratio of these two pieces of information, i.e. the ratio of the number of input/output interfaces to the size of the storage area available to them. In an embodiment, when initialising the hypervisor interface, the number of input/output virtual machine interfaces to support is selected, and thus this may affect the size of the storage area available to them, e.g. if the size of the storage area is fixed.

The selected pieces of information may also comprise the version of the interface initialisation information structure that the accelerator supports, as this allows future extensions of the system, and/or the firmware and/or hardware version numbers for the accelerator. In an embodiment these selected pieces of information are written out to the storage area by the accelerator in the first step of the initialisation process, e.g. after the first signal is sent from the processor to the accelerator and before the second signal is sent from the accelerator to the processor.

In the case of hypervisor interface initialisation, in an embodiment the initialisation parameters that are written by the processor in response to the second signal from the accelerator (e.g.) comprise the number of other interfaces, e.g. power management and/or virtual machine interfaces (in addition to the hypervisor interface), to be initialised. This may also indirectly determine the memory size available for each of the virtual machine interfaces. The parameter information may also comprise the version of the hypervisor interface protocol to initialise. This facilitates future extensions of the initialisation information and/or of the communication mechanism used in the system after initialisation. In an embodiment these pieces of initialisation information are written out to the storage area by the processor during the initialisation of the hypervisor interface, e.g. following the second signal being sent from the accelerator to the processor.

In the case of hypervisor interface initialisation, in an embodiment, the accelerator writes further selected pieces of information to the shared storage area once it has configured the hypervisor input/output interface. In an embodiment this information comprises the size of the memory required to store the state of a virtual machine interface and/or of the virtual machine interfaces (should it be required to save the state of one of the input/output virtual machine interfaces to memory).

Having the accelerator provide this information helps to decouple the internal function of the accelerator from the hypervisor. This information may also comprise the offset and size of the hypervisor interface structure. This allows greater flexibility in allocating an area of memory available for use by the hypervisor interface. In an embodiment these pieces of selected pieces of information are written out to the storage area after the hypervisor interface has been configured, e.g. before the accelerator sends a fourth signal to the processor to indicate the success (or failure) of the initialisation. Alternatively these selected pieces of information could be written out to the storage area as part of the initialisation parameters, e.g. if the size of the memory required to store the state of a virtual machine interface does not depend on the number of virtual machine interfaces or other parameters for the initialisation of the hypervisor interface.

If the input/output interface being initialised is a virtual machine interface, in an embodiment the selected pieces of "capability" information written out by the accelerator comprise: the size of the memory allocated to the virtual machine interface and/or the overall size of the memory allocated to all of the virtual machine interfaces. In an embodiment the selected pieces of information also comprise the version of the interface initialisation information structure that the accelerator supports and/or the firmware and/or hardware version numbers for the accelerator. In an embodiment these selected pieces of information are written out to the shared storage by the accelerator in the first step of the initialisation process, e.g. after the first signal is sent from the processor to the accelerator and before the second signal is sent from the accelerator to the processor.

In the case of virtual machine interface initialisation, in an embodiment the initialisation parameters that are written by the processor in response to the second signal from the accelerator (e.g.) comprise the version of the virtual machine interface protocol to initialise for the virtual machine interface. This facilitates future extensions of the initialisation information and/or of the communication mechanism used in the system after initialisation. In an embodiment these pieces of initialisation information are written out to the storage area by the processor during the initialisation of the virtual machine interface, e.g. following the second signal being sent by the accelerator to the processor.

In an embodiment, for the initialisation of a virtual machine interface, no further of selected pieces of information are written out to the storage area at a later stage of the initialisation process, e.g. after the virtual machine interface has been configured.

The processor, in response to receiving the second signal from the accelerator, reads the accelerator's capability information from the storage area, and then sends a third signal to the accelerator. This is the signal for the accelerator to configure the input/output interface.

In an embodiment the initialisation process also comprises the step of the processor writing one or more initialisation parameters to the storage area. In an embodiment these initialisation parameters are determined by the processor requesting the initialisation of the input/output interface, e.g. depending on the input/output interface to be initialised and/or depending on the capability information, and then written to the storage area, from where they can be, and in an embodiment are, read by the accelerator. In an embodiment the initialisation parameters include the type of interface to initialise. This step is carried out following the processor reading the accelerator's capability information from the storage area, and also in response to the second signal being sent from the accelerator to the processor. In an embodiment the initialisation parameters that are set are based on the read accelerator capability information. In an embodiment, following this step, the processor sends the accelerator the third signal, to request that the accelerator configures the input/output interface, based on the initialisation parameters.

As indicated above, the step in the initialisation process of the accelerator configuring the input/output interface being initialised for the submission of tasks to the accelerator is carried out in response to the third signal being sent from the processor to the accelerator and, in an embodiment, uses initialisation parameters, e.g. which have been read from the storage area by the accelerator. In an embodiment the configuration process comprises configuring the storage area to be used for communication, e.g. the circular memory buffers and/or other data structure, for the input/output interface in question.

In an embodiment, following the configuration of the input/output interface, a fourth signal is sent from the accelerator to the processor indicating the outcome, e.g. the success or failure, of the configuration and thus the initialisation. In an embodiment, when the configuration fails, the initialisation process jumps back to the step of writing out the accelerator's capability information to the storage area (along with sending the fourth signal to indicate the failure of the configuration), and repeating the steps thereafter until the initialisation process is completed successfully.

In an embodiment the signals that help to indicate that the initialisation is progressing correctly are exchanged at each step of the initialisation process. In an embodiment, when an error is detected the initialisation may be re-started or it may jump back to an earlier step. Furthermore, a request for initialisation of the one or more input/output interfaces may be received before an initialisation which is currently being performed has finished. When this happens, in an embodiment the re-start of the initialisation overrides a previously request to initialise the one or more input/output interfaces. This helps to ensure that the system is initialised correctly.

Once initialised, the operating system (virtual machine) input/output interfaces can be, and in an embodiment are, managed by the hypervisor via the hypervisor interface. In particular, in an embodiment the hypervisor manages the allocation of the input/output interfaces to the one or more operating systems so that they can submit tasks to the accelerator. In an embodiment this is achieved by means of the hypervisor issuing particular commands to the accelerator via the hypervisor interface.

In an embodiment, the components in the data processing system, e.g. the accelerator, the hypervisor and the one or more operating systems, are arranged to be able to respond to and/or to provide a predefined set of commands for this purpose. This then provides a generic communications protocol that can be used for the control and management of the input/output interfaces.

In an embodiment the hypervisor can (issue a command to) pause the communication between one of the operating systems and the accelerator via an input/output interface. This may be useful when the resources of the accelerator are needed to be used for another operating system that already has an input/output interface connection with the accelerator. In an embodiment pausing the communication includes ensuring that there are no active tasks being run on the accelerator by the operating system that is being paused, such that no further communication between the operating system and the accelerator is going to occur.

When a pause is employed, in an embodiment the hypervisor is also arranged to resume the paused communication between the operating system and the accelerator, e.g. when sufficient resources become available for the operating system to submit further tasks to the accelerator for execution.

The pause command may allow time for tasks related to the interface to be paused to complete before the "pause" is effected, if desired. In this case, in an embodiment a timeout that triggers the pause operation is triggered if the tasks do not complete within a set time.

In an embodiment the hypervisor can also and/or instead (issue commands to) stop the communication between one of the operating systems and the accelerator via an input/ output interface and to then disable the input/output interface and stop any task running via the interface. This can then allow an input/output interface that is being used by one instance of an operating system to be re-allocated to another operating system instance (for example). This will then facilitate, for example, dynamically managing the connection of the operating systems to the accelerator via the accelerator's input/output interfaces, thereby to allow, e.g., operating systems with tasks of higher priority, for example, to be connected to the accelerator in place of operating system instances with tasks of lower priority.

Thus in an embodiment the hypervisor can stop tasks submitted by one operating system currently running on the accelerator, in order to connect another of the operating systems to the accelerator via the input/output interfaces.

Where tasks using an input/output interface are stopped, then in an embodiment, the process also operates to save the state of the input/output interface to memory, so that it can then be restored and the task or tasks resumed at a later time. In an embodiment the amount of memory required to save the state of an input/output interface is provided, e.g. written out to the memory, by the accelerator during initialisation of the accelerator.

Thus, in an embodiment the hypervisor can (issue commands to) save the state of an input/output interface to memory, so that it can be restored and a task resumed at a later time.

In an embodiment there are a number of alternative task "stopping" mechanisms that can be used, to facilitate stopping tasks using more efficient mechanisms. In an embodiment the stopping mechanisms comprise one or more commands which are issued by the hypervisor to the accelerator, or to a particular input/output interface, in order to stop a task, or set of tasks, from that input/output interface from continuing to be executed on the accelerator.

In an embodiment, it is possible for a command to be issued to stop the execution of tasks via an interface in a fixed period of time. However, as this "hard stop" may require a relatively large amount of state to be saved in order to be able to resume the task later on, in an embodiment the hypervisor can also issue a "soft stop" command that (potentially) allows running tasks to be completed before the connection between the operating system and the accelerator is disabled. In this arrangement, the system could simply wait until any running task completes but, in an embodiment, the hypervisor sets a (longer) time limit for the task to complete following a soft-stop command, and if the task is still running at the end of the time limit, in an embodiment the hypervisor is arranged to issue a "hard stop" command that will more quickly stop the tasks currently running on the accelerator.

In an embodiment, as even a "hard stop" may not complete within a fixed period of time, e.g. if memory needs to be swapped in or page faults require management by the operating system, the hypervisor can and does also set a time limit however a task is to be stopped that if reached and the task has not been stopped (including the state of the input/ output interface having saved to memory), triggers direct and immediate termination of the task. This may result in an error message and the task being unable to be resumed or restored later. However, it does ensure the freeing up of the input/output interface that was being used.

As has been alluded to, in the set of embodiments in which the hypervisor is able to pre-empt or soft-stop tasks being run by one of the processors on the accelerator, in an embodiment the hypervisor is also arranged to save the state of the input/output interface (to which the operating system was connected) to memory, so that it can be restored and the tasks resumed at a later time.

When the data processing system saves the state of a certain input/output interface (following the disconnection of an operating system from the input/output interface thus disconnecting the operating system from the accelerator), in an embodiment a set of selected pieces of information will be saved to memory such that the interrupted task which was being executed on the accelerator can be resumed at a later time.

In one set of embodiments the set of selected pieces of information to be saved to memory comprises one or more of: details of the command and response memory buffers, pending signals to and/or from the operating system, whether the input/output interface was in the process of being initialised when it was saved, details of any suspended jobs to be resumed, e.g. automatically, when the connection is restored, and configurations of the input/output interface made by the operating system, e.g. memory management unit settings. These pieces of information are characteristic of the state of the interface and as such allow the interrupted task to be resumed once the connection between the disconnected operating system and the accelerator has been restored via an input/output interface, i.e. through the saved state of the previous input/output interface being restored to the new input/output interface.

These selected pieces of information, representative of the state of the input/output interface, do not necessarily need to be understood by the hypervisor. They can therefore be written out in any convenient format by the accelerator.

The set of selected pieces of information to be saved to memory may also comprise one or more of: a flag indicating if there is a pending command or task from the processor to be executed, a flag indicating if there is a suspended job to be resumed, a flag to indicate if the operating system is waiting for a response from the accelerator, whether or not the input/output interface the operating system was connected to had been initialised, and how much the operating system has used the accelerator, e.g. the number of accelerator cycles the operating system has used or how long the operating system has been blocked from running a task on the accelerator by a higher priority task from another operating system. In an embodiment this set of selected pieces of information are shared with the hypervisor and thus allow the hypervisor to make to make intelligent scheduling decisions, e.g. to restore the input/output interface quickly if there are high priority tasks pending. In an embodiment, as these pieces of information need to be understood by the hypervisor, they are written out in a format which can be interpreted by the hypervisor.

Thus in an embodiment, the set of selected pieces of information written out to memory comprises a sub-set of information which is written out in a format that can be interpreted by the hypervisor and a sub-set of information which is written out in a format that does not need to be interpreted by the hypervisor, e.g. is in a format specific to the accelerator.

As has been discussed above, following the suspension of a task running on the accelerator which, in an embodiment, will involve saving the state of the input/output interface to memory, in an embodiment at some later time the task will be resumed so that it can be completed. Therefore in one set of embodiments the hypervisor is able to (and to issue a command to) restore the state of a saved input/output interface from memory. It is not necessary for the input/output interface used for the "restored" input/output interface to be the same one as that to which the operating system was previously connected, i.e. into which the saved state of the input/output interface was previously loaded, owing to the generic nature of the communication. This lack of restriction on which input/output interface needs to be used enables the data processing system to be flexible in operation and even allows the migration of virtual machines between different accelerators, in the set of embodiments in which the data processing system comprises a plurality of accelerators, or even virtual machines to be migrated to a completely separate data processing system (as long as that data processing system is arranged in the manner of the technology described herein, i.e. with a compatible accelerator). It also enables effective power management of the system which is transparent to the virtual machines.

It will be appreciated from the above, that in an embodiment, the system supports and uses a predefined set of commands that includes one or more of, and in an embodiment all of, the following commands: a command that can initialise (and in an embodiment reset) an input/output interface between an instance of an operating system and the accelerator; a command that can pause a task for an input/output interface between an instance of an operating system and the accelerator (in an embodiment this also ensures that there is no further communication between the operating system and the accelerator and, in an embodiment, that there are no further accelerator tasks active from the operating system via the interface in question); a command that can save the state of the input/output interface between an operating system and the accelerator; a command that can restore (load) the state of a saved operating system input/output interface from memory; a command that resumes an input/output interface between an operating system and the accelerator; and a command that can disable an input/output interface and stop any task running via the interface.

This, and the generic communication with the accelerator, then facilitates dynamic management of the one or more operating systems (virtual machines) with the accelerator, as virtual machines (operating systems) can be swapped in and out of connection with the accelerator via the input/output interfaces. Furthermore, migrating of virtual machines to other of the one or more processors and also to different accelerators is possible owing to the generic nature of the accelerator(s) and the communication protocol. Thus the virtualisation of the control plane can be operated in a very flexible manner, with separate control paths to the accelerator for each virtual machine.

To further facilitate intelligent scheduling of the connection of the virtual machines to the accelerator by the hypervisor, in one set of embodiments the data processing system comprises a storage area accessible by the hypervisor and the accelerator, and the accelerator is arranged to write one or more selected pieces of information representative of one or more scheduling statistics of the accelerator periodically to the storage area, in an embodiment without having received a request for the one or more selected pieces of information from the hypervisor. By periodically writing out the scheduling statistics, particularly without a request from the hypervisor, enables the scheduling statistics to be readily available to the hypervisor and thus gives a very efficient way of accessing the scheduling statistics because the hypervisor simply needs to read them from the storage area which greatly reduces the latency of this process, compared to the hypervisor sending a request to the accelerator for specific information and then waiting for the response.

As will also be apparent to the skilled person, the one or more selected pieces of information representative of the scheduling statistics could be used for a whole variety of tasks, as they would presently be used in such a data processing system. However, because access to the scheduling statistics is quick and easy, in using the technology described herein, this allows the information to be used in ways which were not contemplated previously. For example, the connection of the virtual machines to the accelerator can be managed dynamically by the hypervisor, with the scheduling statistics being used to determine whether the hypervisor can stop a current process and create a new one. This could be done by looking at the scheduling statistics regarding how for long each of the virtual machines connected to the accelerator has been idle, and removing a virtual machine which has been idle for more than a certain length of time, e.g. 0.5 s, such that a new virtual machine wishing to submit tasks to the accelerator can be connected by the hypervisor. The priority of running and pending tasks could be determined from the scheduling statistics by the hypervisor. Alternatively, running and pending tasks could generate their own priorities which could then be read by the hypervisor and compared.

The technology described herein can be implemented in any suitable system, such as a suitably configured microprocessor based system. In an embodiment, the technology described herein is implemented in a computer and/or micro-processor based system.

The data processing system may also comprise, and in an embodiment does also comprise, and/or is in communication with, one or more memories and/or memory devices that store the data described herein, and/or that store software for performing the processes described herein. The data processing system may also be in communication with a host microprocessor, and/or with a display for displaying images based on the data described above, and/or with a graphics processor for processing the data described above.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can, and in an embodiment do, include, as appropriate, any one or more or all of the features described herein.

The methods of the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a data processing system, processor, or microprocessor system comprising a data processor causes in conjunction with said data processor said processor, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may be embodied as a computer program product for use with a computer system. Such an implementation may comprise a series of computer readable instructions fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows schematically a data processing system 1 in which an accelerator (GPU) 2 that comprises an execution unit 5, a scheduler 3, a hypervisor interface (HVIF) 4 and a memory management unit (GPU MMU) 6, acts as a common shared resource for plural applications (App) 8 executing on respective virtual machines (VM) 10. (As shown in FIG. 1, and as will be appreciated by those skilled in the art, each virtual machine 10 comprises a respective operating system (OS) 12 that is executing on a common host processor (CPU) 14 to provide the "virtual machine", and there are respective applications 8 operating within each operating system (virtual machine) that will then use the execution unit 5 as a resource. For the purposes of clarity only two virtual machines 10 are shown in FIG. 1, though in reality the system could comprise more, for example greater than the number of input/output interfaces 16.)

In order to allow the applications 8 to use the execution unit 5 to perform tasks, the accelerator 2 has a plurality of "virtual machine" input/output interfaces (VMIF) 16 comprising one or more associated sets of registers 18 and one or more circular memory buffers 17 which together function as the virtual machine input/output interfaces 16 for submitting tasks to the execution unit 5 (and thus to the accelerator 2) and that the respective operating system 12 can store information needed by the execution unit 5 in when the execution unit 5 (the accelerator 2) is to perform a task for a given application 8. FIG. 1 shows a system with eight input/output registers 18 per VMIF 16, although other arrangements would, of course, be possible. The registers 18 are used as a signalling mechanism to signal to the accelerator 2, for example, that information has been written to the circular memory buffers 17, e.g. for use by the execution unit 5, or that information should be written to the circular memory buffers 17, e.g. by the execution unit 5, etc.

Other arrangements for the "virtual machine" input/output interfaces (VMIF) 16 would be possible, if desired.

As shown in FIG. 1, the system 1 also includes a hypervisor 20. The hypervisor 20 can send commands to the accelerator 2 via a hypervisor interface 4 to, inter alia, control the allocation of the input/output interfaces 16 to virtual machines (operating systems) 10 wishing to access the accelerator's resources.

The accelerator 2 and the host processor 14 each include respective memory management units 6, 22. The memory management units 6, 22 facilitate access to a respective storage area (VM memory) 24 for each virtual machine 10 that has been allocated an input/output interface 16.

The memory management unit 6 on the accelerator 2 is controlled by the hypervisor 20 via a control interface 23. The VM memories 24 are located in a memory 26 which also contains the page table addresses (GPU page tables) 28 for the accelerator 2. The execution unit 5 also has access to the memory management unit 6 to allow it to access the data in the VM memories 24 when while it is executing tasks submitted by the virtual machines 10.

The memory management units translate virtual memory addresses to physical memory addresses. The stage 2 page table translations are configured to isolate the memory regions 24 for each virtual machine 10 from each other, so that requests from different operating systems for data from memory do not corrupt each other.

As shown in FIG. 1, when an application 8 wishes to use the execution unit 5 to perform a task, it will access a set of the registers 18 of the accelerator 2 via its respective operating system 12. FIG. 1 also shows a scheduler 3 that acts to arbitrate between and schedule tasks in the registers 18.

As can be seen from FIG. 1, the virtual machines 10 can communicate directly with their respective input/output interfaces 16, thus bypassing the hypervisor 20 and its interface 4.

Operation of the data processing system 1 shown in FIG. 1 will now be described with reference to the flow chart shown in FIG. 2.

Figure 2:
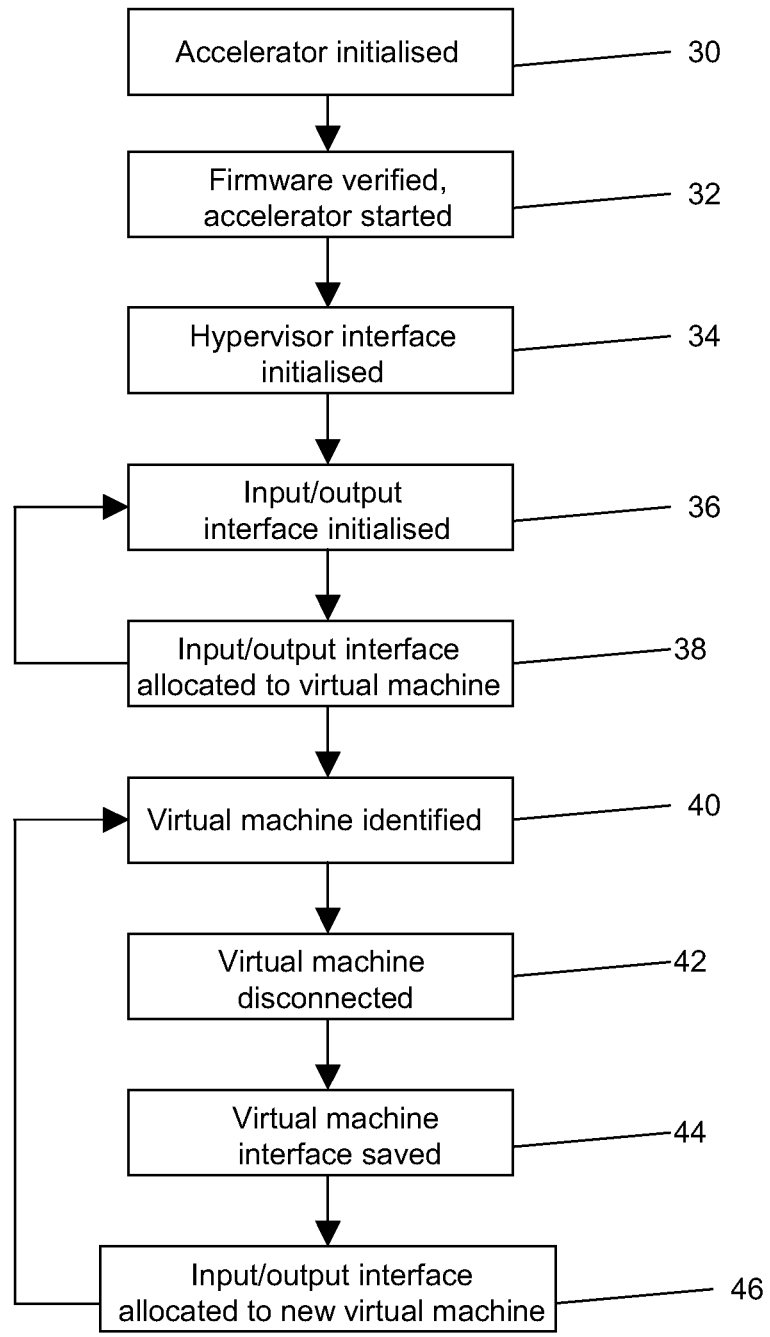
FIG. 2 shows operation of an embodiment of a data processing system.

Upon start up of the system 1, e.g. on power-up, the accelerator 2 is initialised by the hypervisor system (the hypervisor 20 and the hypervisor interface 4) (step 30, FIG. 2). The initialisation includes storing the accelerator's firmware in the hypervisor's file system. The hypervisor 20 verifies the integrity of the firmware, copies it into the accelerator's local memory and starts the accelerator 2 (step 32, FIG. 2). The details of these steps are known to the skilled person and their specifics are not of particular relevance to the technology described herein.

Once the accelerator is booted, the hypervisor interface 4 is initialised (step 34, FIG. 2) which then allows the accelerator's memory management unit 6 to be used to access the GPU page tables 28. The initialisation of the hypervisor interface 4 will be described in more detail below. The hypervisor interface 4 is initialised whenever the data processing system 1 is powered on, however this is not necessary for the subsequent initialisation of the virtual machine input/output output interfaces because they do not need to have any knowledge of the power state of the data processing system 1.

Once the hypervisor interface 4 has been initialised, the hypervisor 20 can initialise a particular virtual machine 10, e.g. that wishes to submit a task to the execution unit 5 on the accelerator 2. The hypervisor 20 then assigns a particular virtual machine input/output interface 16 to the virtual machine 10, the virtual machine 10 is started and the host processor 14 for the virtual machine 10 initialises the virtual machine input/output interface 16, as will also be described in more detail below. Following this initialisation, the virtual machine 10 is able to use the virtual machine input/output interface 16 to communicate with the accelerator 2 and thus submit tasks to the execution unit 5.

The initialisation of the hypervisor interface 4 will now be described in more detail with reference to the flow chart of FIG. 3, the signalling diagram of FIG. 4 and the components of FIG. 1.

Figure 3:
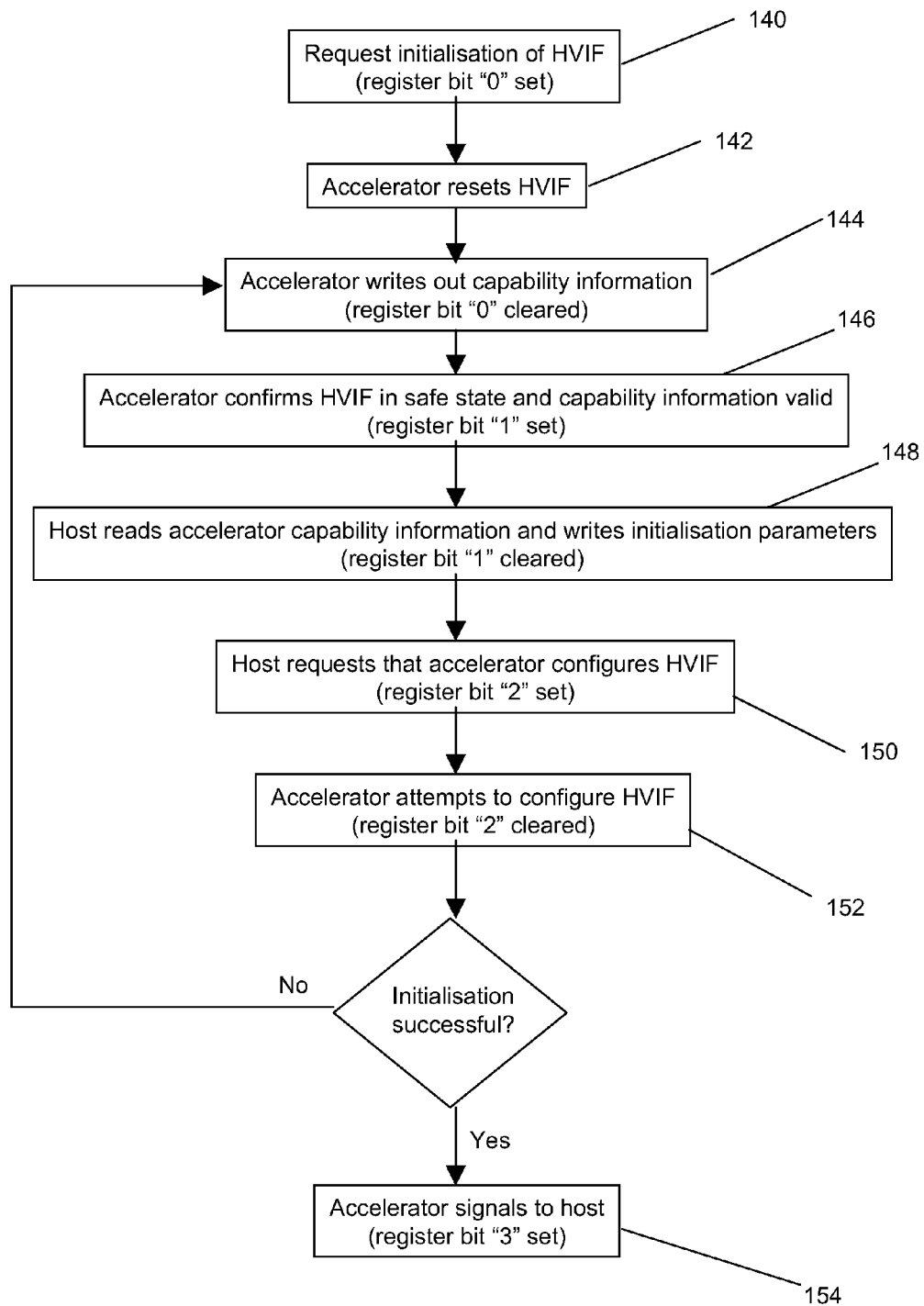
FIG. 3 shows a flow chart detailing initialisation of a hypervisor interface.
Figure 4:
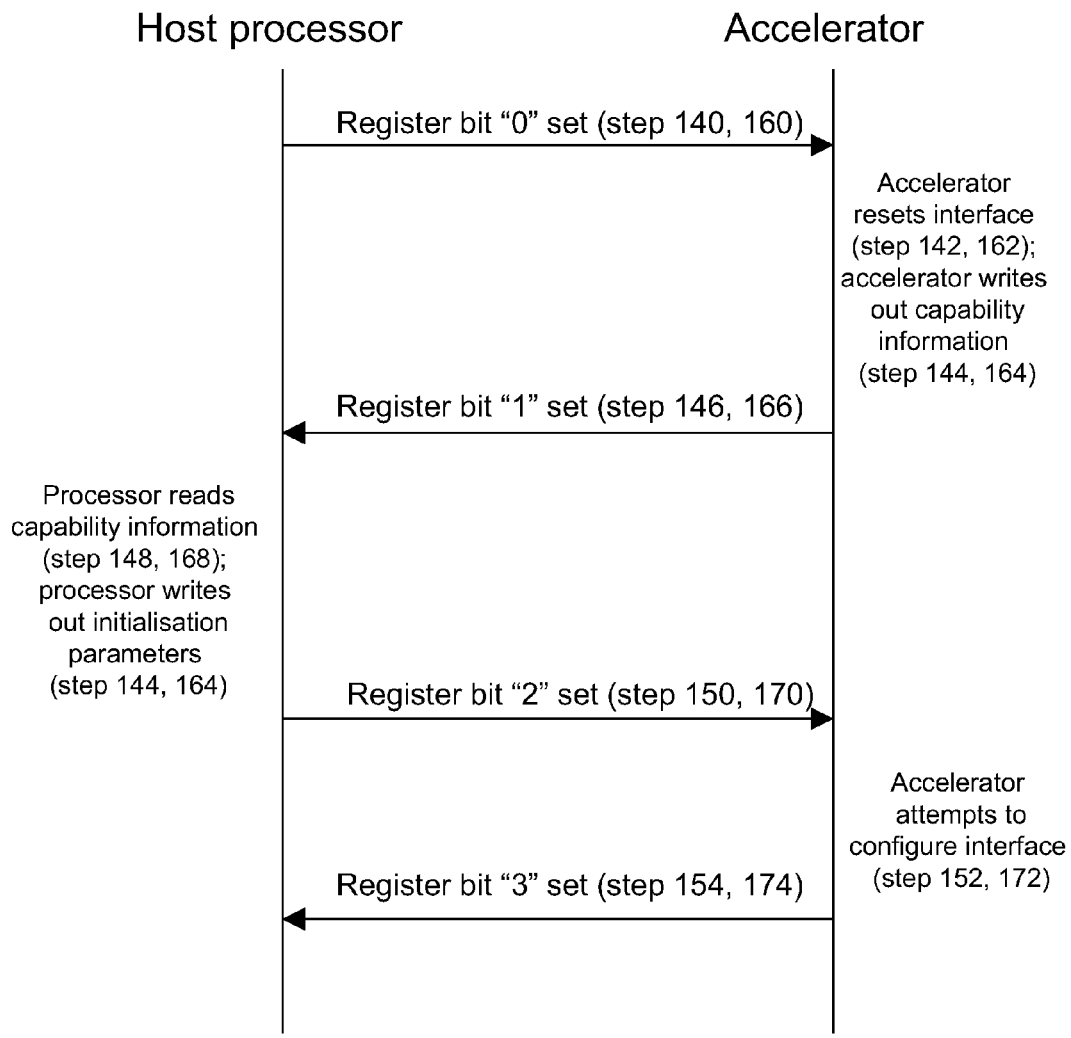
FIG. 4 shows a signalling diagram associated with FIG. 3.

First, the host processor 14 (to the virtual machines 10) requests initialisation of the hypervisor interface (HVIF) 4 by setting bit "0" of a register in the HVIF 4, i.e. from 0 to 1, to send a signal from the host processor 14 to the accelerator 2 (step 140, FIGS. 3 and 4). On receiving the bit "0" signal, the accelerator 2 resets the hypervisor interface 4 to an initial safe state, if necessary first cancelling any ongoing tasks related to the hypervisor interface 4, e.g. aborting any previous operation related to the hypervisor interface 4 being initialised (step 142, FIGS. 3 and 4).

Next, the accelerator 2 writes out information representative of its capabilities to a storage area associated with the hypervisor interface 4, e.g. the accelerator version, the different hypervisor interface protocols supported, how many virtual machine input/output interfaces are supported, etc., and clears register bit "0" (step 144, FIGS. 3 and 4). Once steps 142 and 144 have been completed successfully, i.e. all ongoing tasks aborted and the accelerator's capabilities written out, the accelerator 2 responds to the host processor 14 that the hypervisor interface 4 has transitioned into an initial safe state and that the information representative of the accelerator's capabilities is valid, by setting bit "1" of the HVIF register, thereby sending a signal from the accelerator 2 to the host processor 14 (step 146, FIGS. 3 and 4).

In response to the register bit "1" signal from the accelerator 2, the host processor 14 reads the information representative of the accelerator's capabilities from the storage area and writes any required initialisation parameters, e.g. the requested hypervisor interface protocol to use, to the storage area, and clears register bit "1" (step 148, FIGS. 3 and 4). The host processor 14 then requests that the accelerator 2 configures the hypervisor interface 4 by setting bit "2" in the HVIF register to send a signal to the host processor 14 from the accelerator 2 (step 150, FIGS. 3 and 4).

On receiving the register bit "2" signal from the host processor 14, the accelerator 2 attempts to configure the hypervisor interface 4, and clears register bit "2" (step 152, FIGS. 3 and 4). Step 152 includes configuring a region of the storage area as a circular memory buffer for use by the hypervisor 20 to store information for controlling accelerator 2. If this attempt is successful, the accelerator 2 sets bit "3" of the HVIF register to send a signal to the host processor 14 (step 154, FIGS. 3 and 4). At this stage the accelerator 2 may also write out further information representative of its capabilities to the storage area, e.g. the amount of memory required to save the state of each virtual machine input/output interface 16.

If the attempt to configure the hypervisor interface 4 fails, the initialisation process reverts back to step 144, i.e. the accelerator 2 writes out information representative of its capabilities to the storage area, with all the following steps happening subsequently until the initialisation has completed successfully.

Now that the system 1 has been initialised, the accelerator 2 is ready for one or more of the virtual machines 10 to connect to the input/output interfaces 16 in order to submit tasks to the accelerator 2 for execution. First the hypervisor 20 selects and requests initialisation of an input/output interface 16 (step 36, FIG. 2) and then allocates the input/output interface 16 to a virtual machine 10 wishing to access the accelerator's resources (step 38, FIG. 2). This allocation also involves modifying the page tables for the virtual machine 10 to enable it to access the input/output interface 16, as well as updating the GPU MMU 6 page tables so that the appropriate memory is used for the execution of tasks submitted by the virtual machine 10. Steps 36 and 38 may be repeated a number of times until a number or all of the input/output interfaces 16 have had a virtual machine 10 mapped to them.

The initialisation of a virtual machine input/output interface 16, which allows the virtual machine 10 to submit tasks to the accelerator 2 for execution, is very similar to the initialisation of the hypervisor interface 4, and will now be described in more detail with reference to the flow chart of FIG. 5, the signalling diagram of FIG. 4 and the components of FIG. 1.

First, the hypervisor 20 allocates one of the virtual machine input/output interfaces to a virtual machine 10 that wishes to submit tasks to the accelerator 2 (step 158). Then the host processor 14 (to the virtual machines 10) requests initialisation of a virtual machine input/output interface 16 by setting bit "0" of the register 18 of the virtual machine interface in question, i.e. from 0 to 1, to send a signal from host processor 14 to the accelerator 2 (step 160, FIGS. 4 and 5). On receiving the bit "0" signal, the accelerator 2 resets the virtual machine input/output interface 16 to an initial safe state, if necessary first cancelling any ongoing tasks related to the virtual machine input/output interface 16, e.g. aborting any previous operation related to that particular virtual machine input/output interface 16 being initialised (step 162, FIGS. 4 and 5).

Figure 5:
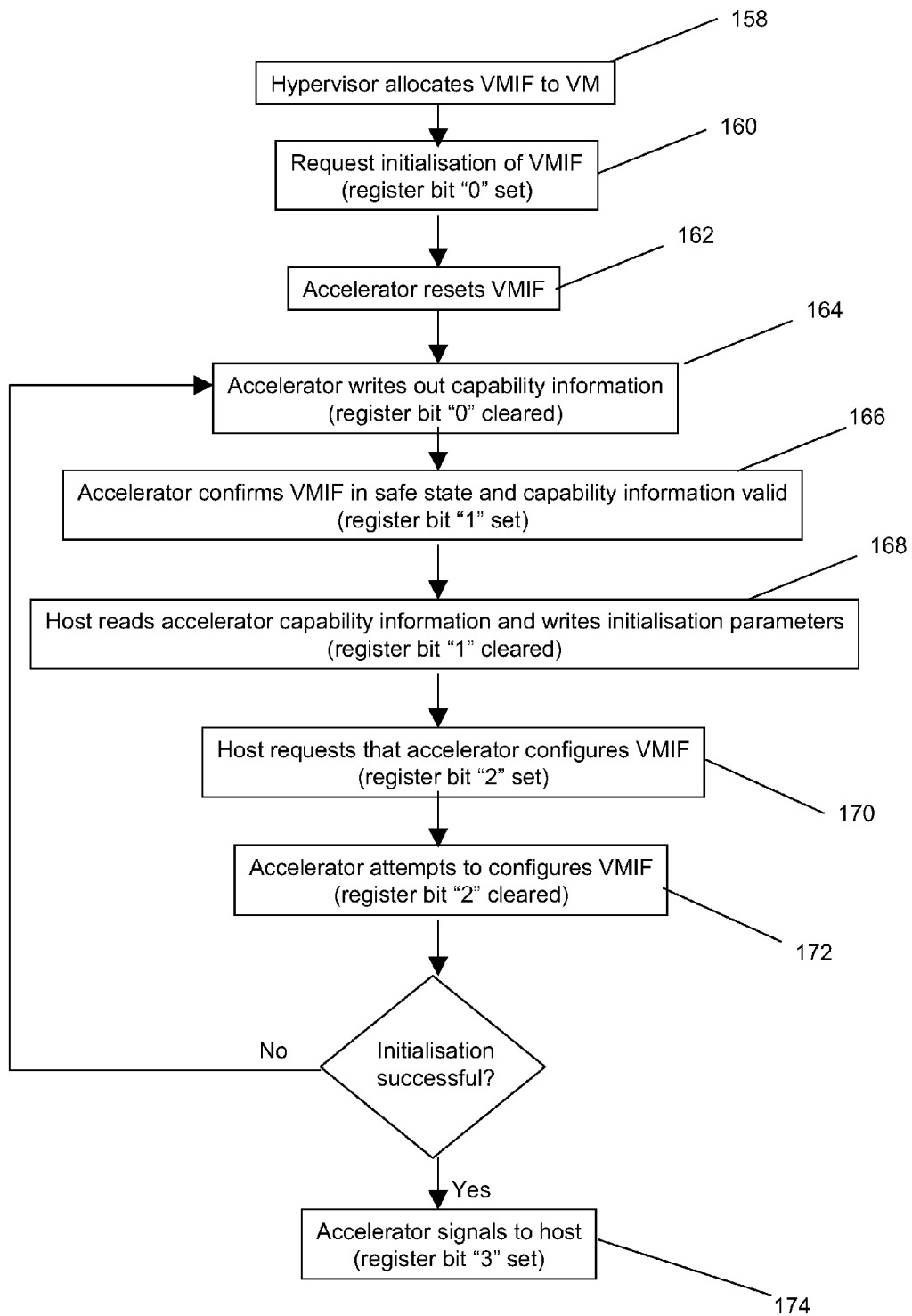
FIG. 5 shows a flow chart detailing initialisation of a virtual machine interface.

Next, the accelerator 2 writes out information representative of its capabilities to a region of the storage area for the virtual machine input/output interface 16 in question, e.g. the accelerator version, the different virtual machine input/output interface protocols supported, how many virtual machine input/output interfaces are supported, etc., and clears register bit "0" (step 164, FIGS. 4 and 5). Once steps 162 and 164 have been completed successfully, i.e. all ongoing tasks aborted and the accelerator's capabilities written out, the accelerator 2 responds to the host processor 14 that the virtual machine input/output interface 16 has transitioned into an initial safe state and that the information representative of the accelerator's capabilities is valid, by setting bit "1" of the appropriate register 18, thereby sending a signal from the accelerator 2 to the host processor 14 (step 166, FIGS. 4 and 5).

In response to the register bit "1" signal from the accelerator 2, the host processor 14 reads the information representative of the accelerator's capabilities from the appropriate region of the storage area and writes any required initialisation parameters, e.g. the requested virtual machine input/output interface protocol to use, to the storage area, and clears register bit "1" (step 168, FIGS. 4 and 5). The host processor 14 then requests that the accelerator 2 configures the virtual machine input/output interface 16 by setting bit "2" in the appropriate register 18 to send a signal from the host processor 14 to the accelerator 2 (step 170, FIGS. 4 and 5).

On receiving the register bit "2" signal from the host processor 14, the accelerator 2 attempts to configure the virtual machine input/output interface 16, and clears register bit "2" (step 172, FIGS. 4 and 5), i.e. by configuring the register 18 and a region of the storage area as a circular memory buffer 17 which will function as the virtual machine input/output interface 16 for submission of tasks to the accelerator 2. If this attempt is successful, the accelerator 2 sets bit "3" of the appropriate register 18 to send a signal to the host processor 14 (step 174, FIGS. 4 and 5). At this stage the accelerator 2 may also write out further information representative of its capabilities to the storage area, e.g. the amount of memory required to save the state of each virtual machine input/output interface 16.

If the attempt at configuring the virtual machine input/output interface 16 fails, the initialisation process reverts back to step 164, i.e. the accelerator 2 writes out information representative of its capabilities to the appropriate storage area, with all the following steps happening subsequently until the initialisation has completed successfully.

The initialisation of one or the virtual machine input/output interfaces takes place whenever a virtual machine 10, that does not already have an allocated virtual machine input/output interface 16, wishes to submit a set of tasks to the accelerator 2. If there is a free virtual machine input/output interface 16 then that can simply be allocated to the virtual machine 10. If there are no free virtual machine input/output interfaces 16 then the hypervisor 20 may choose to end a running task on the accelerator 2 in order to connect another virtual machine 10, e.g. with a pending task of higher priority, to the accelerator 2, as will be discussed in more detail below.

Once an operating system has been allocated an input/output interface 16, then the operating system can use that interface to submit tasks for applications to the accelerator 2. This may continue so long as there are tasks that applications executing within the operating system wish the accelerator to perform, and while the operating system has the input/output interface 16 allocated to it.

As discussed above, the system 1 may comprise a greater number of virtual machines 10 than the number of input/output interfaces 16 available. There will therefore be occasions on which there is a greater demand for the accelerator's resources than the number of input/output interfaces 16 can handle, i.e. when the number of virtual machines 10 wishing to connect to the accelerator 2 via the input/output interfaces 16 is greater than the number of input/output interfaces 16. The present embodiment allows this to be handled by dynamically managing the connection of the virtual machines 10 to the accelerator 2 in order to make sure that the tasks with the highest priority are being run on the accelerator 2 at any given time. Such dynamic management will now be described.

To facilitate the dynamic management of the connection of the virtual machines 10 to the accelerator 2 via the input/output interfaces 16, the hypervisor can issue (via the hypervisor control interface 4), and the accelerator 2 can respond to, a predefined set of commands for this purpose.

In the present embodiment, these commands comprise: an initialization and/or reset command that can be used to initialise and/or reset a virtual machine input/output interface; a disable command that can disable a virtual machine input/output interface and stop any task from the interface (as will be discussed further below, this disable command can be used to indicate varying levels of stopping "urgency" in order to facilitate subsequently resuming the tasks in question); an enable and/or resume command to enable or resume a virtual machine input/output interface; a save command to instruct the accelerator to save the state of a virtual machine input/output interface to memory (in this case the hypervisor provides the memory area for the save to the accelerator as a parameter of the command, and the interface is expected to be disabled before the save command is applied); a load and/or restore command to load and/or restore a saved virtual machine input/output interface state from memory; and a pause command to pause the processing of tasks that are being submitted via a virtual machine input/output interface.

Other arrangements and set of commands could, of course, be used if desired. For example a combined disable and save command could be provided.

Figure 6:
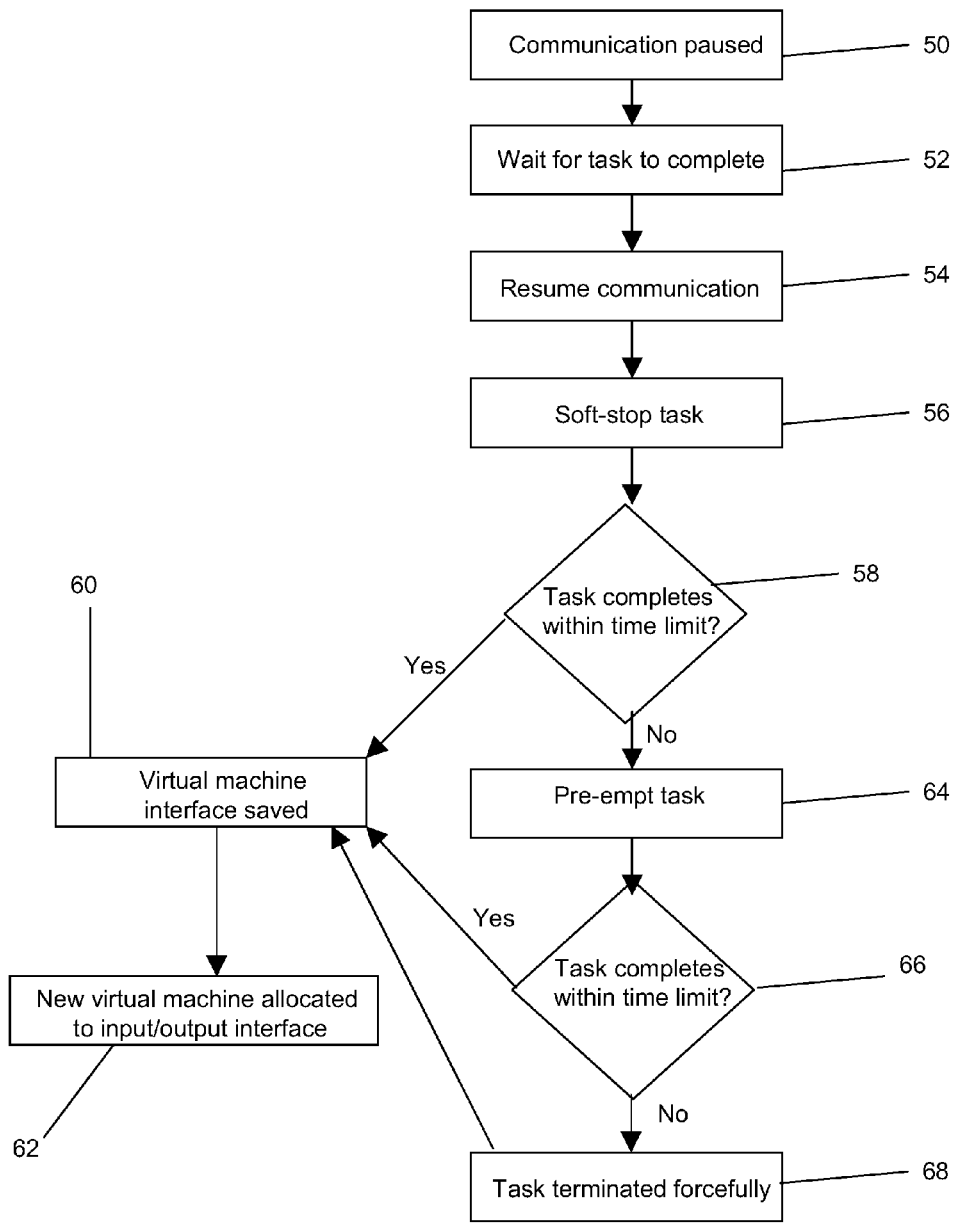
FIG. 6 shows further detail regarding operation of an embodiment of a data processing system.

FIGS. 2 and 6 illustrate the use of these commands to dynamically manage the connection of virtual machines 10 to the accelerator 2.

As shown in FIG. 2, when the hypervisor 20 is aware that a task of higher priority wishes to be executed on the accelerator 2, it first identifies a virtual machine 10 to disconnect from a input/output interface 16 (step 40, FIG. 2). The hypervisor 20 then issues a command to the selected input/output interface 16 to disconnect the virtual machine 10 from its connection with the input/output interface 16 (step 42, FIG. 2) (this may involve modifying the page tables for the virtual machine 10 to disable its access to the input/output interface 16, and updating the GPU MMU 6 page tables so that the memory area is no longer used for the execution of tasks submitted by the virtual machine 10). The hypervisor 20 issues a further command to save the state of the input/output interface 16 for that virtual machine 10, e.g. including details of the interrupted task, to the respective VM memory 24 (step 44, FIG. 2).

Following the save of state of the input/output interface, the physical registers 18 for that input/output interface 16 can now be re-used for connection with the different virtual machine 10. Thus the hypervisor 20 issues a load command to allocate the input/output interface 16 to the new virtual machine 10 (step 46, FIG. 2) to enable the virtual machine 10 to submit tasks to the accelerator 2 for execution (i.e. this is a repetition of step 38 and thus also involves modifying the page tables for the virtual machine 10 to enable it to access the input/output interface 16, as well as updating the GPU MMU 6 page tables so that the appropriate memory is used for the execution of tasks submitted by the virtual machine 10).

Steps 40, 42, 44 and 46 can be repeated in sequence to allow for continuous dynamic management of the virtual machines 10 connected to the accelerator 2.

The new virtual machine 10 may be one that had previously been disconnected from the accelerator 2 and thus the state of its input/output interface 16 saved to memory 24. In this instance step 46 includes restoring the input/output interface 16 from memory 24 such that the pending tasks stored in the input/output interface 16 when the virtual machine 10 was disconnected can be resumed.

The step of disconnecting a virtual machine 10 from an input/output interface 16 (step 42) may comprise a number of sub-steps as will now be described with reference to FIG. 6.

If the accelerator's resources are needed for use by another virtual machine 10 already connected to the accelerator 2, but this does not require a virtual machine 10 to be disconnected in order to free up these resources, the communication between one of the virtual machines 10, e.g. running a task of low priority, can be paused (step 50, FIG. 6), while the other virtual machine 10 runs its higher priority task (step 52, FIG. 6). Once the higher priority task has completed, the communication between the paused virtual machine 10 and the accelerator 2 can be resumed (step 54, FIG. 6).

In the event that the connection between a virtual machine 10 and the accelerator 2 needs to be disconnected, in order to connect a different virtual machine 10, the hypervisor 20 can be arranged to "soft-stop" the task running on the current connection (step 56, FIG. 6). A time limit will be set by the hypervisor 20 for the task to complete (step 58, FIG. 6) and if the task completes within this time limit, the input/output interface 16 will be saved to memory for future restoration (step 60, FIG. 6) and the different virtual machine 10 will be connected to the free input/output interface 16, as described above (step 62, FIG. 6).

If the soft-stopped task does not complete within the time limit, the hypervisor 20 is arranged to "hard" pre-empt the task running on the current connection (step 64, FIG. 6). A time limit will be set by the hypervisor 20 for the task to complete (step 66, FIG. 6) and if the task completes within this time limit, the input/output interface 16 will be saved to memory for future restoration (step 60, FIG. 6) and the different virtual machine 10 will be connected to the free input/output interface 16, as described above (step 62, FIG. 6).

If the pre-empted task does not complete within the time limit, the hypervisor 20 is arranged to terminate the task and thus the virtual machine connection forcefully (step 68, FIG. 6). In the present embodiment the termination of the task does not cause the state of the input/output interface 16 to become invalid and thus the virtual machine interface is saved (step 60, FIG. 6). In view of this, the software on the virtual machine 10 may be able to recover. Thus, the termination of the task may cause an application 8 on the virtual machine 10 to fail, but the virtual machine 10 (the operating system) may be able to continue functioning. Alternatively the application 8 may be able to recover from the task being terminated, e.g. if it is possible to rerun the task owing to the lack of side effects of the task (this is often the case for graphics or image processing tasks). In any case, the result is that the input/output interface 16 is available for the different virtual machine 10 to be connected (step 62, FIG. 6).

Other arrangements would be possible. For example, the forceful termination of a task could result in an error message, which may cause the state of the input/output interface 16 to become invalid, making it not possible to save the state of the input/output interface 16.

It can be seen from the above that at least some embodiments of the data processing system 1, the virtual machines 10 are connected to the accelerator via the input/output interfaces 16 such that they are able to communicate with the accelerator 2 directly (independently of the hypervisor), and each have an isolated region of memory 24. This creates a "generic" accelerator which supports a common communication protocol for the hypervisor to manage the virtual machines 10 connecting to the accelerator, owing to the fact that each of connections of the virtual machines 10 to the accelerator are independent of each other and of the hypervisor. Dynamic management of the connection of the virtual machines 10 to the accelerator 2 via the input/output interfaces 16 is also facilitated by this independence and the hypervisor's common communication protocol.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system, wherein the data processing system comprises:
   one or more processors that each execute one or more operating systems, each operating system including one or more applications;
   an accelerator that provides a shared resource for a plurality of the applications;
   one or more input/output interfaces for the submission of tasks to the accelerator;
   a hypervisor that manages the allocation of the input/output interfaces to the operating systems executing on the one or more processors;
   a hypervisor interface that enables communication between the hypervisor and the accelerator;
   a memory accessible to the operating systems executing on the one or more processors and to the accelerator; and
   a memory management unit that controls access to the memory;
   the method comprising:
   when an operating system executing on one of the processors has been allocated an input/output interface to submit a task to the accelerator:
   the operating system, once it has been allocated the input/output interface, communicating with the accelerator via the input/output interface independently of the hypervisor to submit its task to the accelerator;
   the hypervisor using a control interface configured for control of the memory management unit to configure the memory management unit to operate to provide an isolated region of the memory for use by the operating system by implementing a two stage memory mapping and configuring page table translations of a second stage of the two stage memory mapping to provide the isolated memory region whilst the operating system retains its allocated input/output interface; and
   the hypervisor commanding the accelerator to initialize one of the one or more input/output interfaces when an input/output interface is to be allocated an operating system.

2. The method of operating the data processing system as claimed in claim 1, comprising the hypervisor commanding the accelerator to save the state of an input/output interface to memory.

3. The method of operating the data processing system as claimed in claim 1, comprising the hypervisor commanding the accelerator to restore the state of a saved input/output interface from memory.

4. The method of operating the data processing system as claimed in claim 1, comprising the hypervisor commanding the accelerator to pause the communication between an operating system and the accelerator over an input/output interface.

5. The method of operating the data processing system as claimed in claim 4, comprising the hypervisor commanding the accelerator to resume the paused communication between the operating system and the accelerator.

6. The method of operating the data processing system as claimed in claim 1, comprising the hypervisor commanding the accelerator to stop a task submitted by one of the operating systems and currently running on the accelerator.

7. The method of operating the data processing system as claimed in claim 1, wherein each of the one or more input/output interfaces comprises a memory area and a set of one or more registers.

8. A data processing system comprising:
   one or more processors that each execute one or more operating systems, each operating system including one or more applications;
   an accelerator that provides a shared resource for a plurality of the applications;
   one or more input/output interfaces for the submission of tasks to the accelerator;
   a hypervisor that manages the allocation of the input/output interfaces to the operating systems executing on the one or more processors;
   a hypervisor interface that enables communication between the hypervisor and the accelerator;
   a memory accessible to the operating systems executing on the one or more processors and to the accelerator; and
   a memory management unit that controls access to the memory;
   wherein:
   the data processing system is capable of being configured such that an operating system that has been allocated an input/output interface is capable of communicating with the accelerator via the input/output interface independently of the hypervisor to submit its task to the accelerator;
   the accelerator comprises a control interface capable of controlling the memory management unit to configure the memory management unit to provide an isolated region of the memory for use by the operating system by implementing a two stage memory mapping and configuring page table translations of a second stage of the two stage memory mapping to provide the isolated memory region whilst the operating system retains its allocated input/output; and
   the hypervisor is capable of commanding the accelerator to initialize one of the one or more input/output interfaces when an input/output interface is to be allocated an operating system.

9. The data processing system as claimed in claim 8, wherein the hypervisor is capable of commanding the accelerator to save the state of an input/output interface to memory.

10. The data processing system as claimed in claim 8, wherein the hypervisor is capable of commanding the accelerator to restore the state of a saved input/output interface from memory.

11. The data processing system as claimed in claim 8, wherein the hypervisor is capable of commanding the accelerator to pause the communication between an operating system and the accelerator over an input/output interface.

12. The data processing system as claimed in any claim 11, wherein the hypervisor is capable of commanding the accelerator to resume the paused communication between an operating system and the accelerator.

13. The data processing system as claimed in claim 8, wherein the hypervisor is capable of commanding the accelerator to stop a task submitted by one of the operating systems and currently running on the accelerator.

14. The data processing system as claimed in claim 8, wherein each of the one or more input/output interfaces comprises a memory area and a set of one or more registers.

15. A computer readable storage medium storing computer software code which when executing on a processor performs a method of operating a data processing system, wherein the data processing system comprises:
   one or more processors that each execute one or more operating systems, each operating system including one or more applications;
   an accelerator that provides a shared resource for a plurality of the applications;
   one or more input/output interfaces for the submission of tasks to the accelerator;
   a hypervisor that manages the allocation of the input/output interfaces to the operating systems executing on the one or more processors;
   a hypervisor interface that enables communication between the hypervisor and the accelerator;
   a memory accessible to the operating systems executing on the one or more processors and to the accelerator; and
   a memory management unit that controls access to the memory;
   the method comprising:
   when an operating system executing on one of the processors has been allocated an input/output interface to submit a task to the accelerator:
   the operating system, once it has been allocated the input/output interface, communicating with the accelerator via the input/output interface independently of the hypervisor to submit its task to the accelerator;
   the hypervisor using a control interface configured for control of the memory management unit to configure the memory management unit to operate to provide an isolated region of the memory for use by the operating system by implementing a two stage memory mapping and configuring page table translations of a second stage of the two stage memory mapping to provide the isolated memory region whilst the operating system retains its allocated input/output interface; and
   the hypervisor commanding the accelerator to initialize one of the one or more input/output interfaces when an input/output interface is to be allocated an operating system.

\* \* \* \* \*